United States Patent [19]

McKee et al.

[11] Patent Number: 5,219,915
[45] Date of Patent: Jun. 15, 1993

[54] GLASS FIBER-REINFORCED THERMOPLASTIC MOLDING MATERIALS BASED ON POLYESTERS AND GRAFT POLYMERS

[75] Inventors: Graham E. McKee, Weinheim; Manfred Knoll, Wachenheim; Peter Kolm, Neustadt; Dietrich Lausberg, Ludwigshafen, all of Fed. Rep. of Germany

[73] Assignee: BASF Aktiengesellschaft, Ludwigshafen, Fed. Rep. of Germany

[21] Appl. No.: 762,261

[22] Filed: Sep. 20, 1991

Related U.S. Application Data

[63] Continuation of Ser. No. 497,671, Mar. 23, 1990, abandoned.

[30] Foreign Application Priority Data

Apr. 11, 1989 [DE] Fed. Rep. of Germany ....... 3911828

[51] Int. Cl.$^5$ ............................................. C08L 51/04
[52] U.S. Cl. ................................. 524/504; 524/494; 525/78; 525/83; 525/85
[58] Field of Search ................. 524/494, 504; 525/78, 525/83, 85

[56] References Cited

U.S. PATENT DOCUMENTS

| | | | |
|---|---|---|---|
| 4,145,331 | 3/1979 | Sterzel et al. | 524/504 |
| 4,397,986 | 8/1983 | Hornbaker | 525/64 |
| 4,739,010 | 4/1988 | McKee et al. | 525/64 |
| 4,939,201 | 7/1990 | Seiler et al. | 524/504 |

FOREIGN PATENT DOCUMENTS

| | | |
|---|---|---|
| 0297365 | 1/1989 | European Pat. Off. |
| 0310956 | 4/1989 | European Pat. Off. |
| 2255654 | 4/1976 | Fed. Rep. of Germany |
| 2758497 | 4/1979 | Fed. Rep. of Germany |
| 3733839 | 4/1989 | Fed. Rep. of Germany |

*Primary Examiner*—Paul R. Michl
*Assistant Examiner*—Edward Cain
*Attorney, Agent, or Firm*—Oblon, Spivak, McClelland, Maier & Neustadt

[57] ABSTRACT

Thermoplastic molding materials based on a mixture of polybutylene terephthalate and polyethylene terephthalate (a$_1$), graft polymers having acrylate rubbers as the grafting base (a$_2$), copolymers of vinylaromatic monomers and acrylonitrile or methacrylonitrile (a$_3$) and glass fibers (B) have a balanced property spectrum.

5 Claims, No Drawings

GLASS FIBER-REINFORCED THERMOPLASTIC MOLDING MATERIALS BASED ON POLYESTERS AND GRAFT POLYMERS

This application is a continuation of application Ser. No. 07/497,671, filed on Mar. 32, 1990, now abandoned.

The present invention relates to thermoplastic molding materials containing, as essential components, A) from 45 to 90% by weight of a mixture of
- $a_1$) from 50 to 80% by weight of a mixture of
  - $a_{11}$) from 60 to 99% by weight, based on $a_{11}+a_{12}$), of polybutylene terephthalate and
  - $a_{12}$) from 1 to 40% by weight, based on $a_{11}+a_{12}$), of polyethylene terephthalate,
- $a_2$) from 10 to 25% by weight of a graft polymer composed of
  - $a_{21}$) from 50 to 90% by weight of a grafting base of an elastomeric polymer based on
    - $a_{211}$) from 75 to 99.9% by weight of a $C_2-C_{10}$-alkyl acrylate and
    - $a_{212}$) from 0.1 to 5% by weight of polyfunctional monomer having two or more olefinic, nonconjugated double bonds and
    - $a_{213}$) from 0 to 24.9% by weight of further copolymerizable monomers, and
  - $a_{22}$) from 10 to 50% by weight of a graft of
    - $a_{221}$) from 50 to 90% by weight of styrene or substituted styrenes of the general formula I

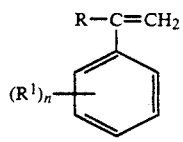

where R is alkyl of 1 to 8 carbon atoms, hydrogen or halogen, $R^1$ is alkyl of 1 to 8 carbon atoms or halogen and n is 0, 1, 2 or 3, or a mixture thereof, and

- $a_{222}$) from 10 to 49% by weight of acrylonitrile or methacrylonitrile or a mixture thereof,
- $a_3$) from 10 to 25% by weight of a copolymer of
  - $a_{31}$) from 50 to 90% by weight of styrene or substituted styrenes of the general formula I or a mixture thereof and
  - $a_{32}$) from 10 to 49% by weight of acrylonitrile or methacrylonitrile or a mixture thereof, and B) from 5 to 50% by weight of glass fibers.

The present invention furthermore relates to the use of such molding materials for the production of moldings, and moldings which are obtainable from the novel molding materials as essential components.

DE-B-27 58 497 describes thermoplastic molding materials based on polyesters and modified styrene/acrylonitrile (SAN) copolymers, the modifiers used being acrylates and/or α-methylstyrene. In the Examples, ASA polymers are used as modified SAN polymers. If the modified SAN polymers constitute the main component in these materials, they can advantageously be used for the production of films. However, the mechanical properties in general are not completely satisfactory, in particular the impact strength and flexural strength. The stability of the properties after prolonged storage at elevated temperatures is also unsatisfactory.

DE-B 22 55 654 describes blends of polybutylene terephthalate and polyethylene terephthalate; however, there is no mention of the graft polymers and copolymers used according to the invention.

It is an object of the present invention to provide thermoplastic molding materials which are based on polyesters and graft polymers and do not have the disadvantages described above. In particular, satisfactory long-term stability of the mechanical properties at elevated temperatures should also be achieved.

We have found that this object is achieved, according to the invention, by the thermoplastic molding materials defined at the outset.

The novel molding materials contain, as component A, from 45 to 90, in particular from 55 to 90, particularly preferably from 60 to 85, % by weight of a mixture of

- $a_1$) from 50 to 80% by weight of a mixture of
  - $a_{11}$) from 60 to 99, preferably from 75 to 97, % by weight, based on $a_{11}+a_{12}$), of polybutylene terephthalate and
  - $a_{12}$) from 1 to 40, preferably from 3 to 25, % by weight, based on $a_{11}+a_{12}$), of polyethylene terephthalate,
- $a_2$) from 10 to 25% by weight of a graft polymer and
- $a_3$) from 10 to 25% by weight of a styrene/(meth)acrylonitrile copolymer.

The polyesters $a_{11}$ and $a_{12}$ contained in the novel molding materials are known per se.

The polyesters can be prepared by reacting terephthalic acid, its esters or other ester-forming derivatives with butane-1,4-diol or ethane-1,2-diol in a conventional manner.

Up to 20 mol % of the terephthalic acid may be replaced with other dicarboxylic acids. Naphthalenedicarboxylic acids, isophthalic acid, adipic acid, azelaic acid, sebacic acid, dodecanedioic acid and cyclohexanedicarboxylic acids, mixtures of these carboxylic acids and ester-forming derivatives thereof may be mentioned here merely by way of example.

Up to 20 mol % of the dihydroxy compounds butane1,4-diol or ethane-1,2-diol may furthermore be replaced with other dihydroxy compounds, e.g. butene-1,4-diol, hexane-1,6-diol, hexane-1,4-diol, cyclohexane-1,4-diol, 1,4-di-(hydroxymethyl)-cyclohexane, bisphenol A, neopentylglycol, mixtures of these diols and ester-forming derivatives thereof.

The viscosity number of the polyesters $a_{11}$ and $a_{12}$, measured in a 0.5% strength by weight solution in a phenol/o-dichlorobenzene mixture (weight ratio 1:1) at 25° C., is in general 50–250, preferably 70–170, $cm^3/g$.

The amount of the polyesters $a_1$) in component A from 50 to 70, % by weight, based on the total weight of components $a_1)+a_2)+a_3$).

The graft polymer $a_2$), which accounts for from 10 to 25, in particular from 12 to 25, particularly preferably from 12 to 20, % by weight of component A, is composed of

- $a_{21}$) from 50 to 90% by weight of a grafting base consisting of
  - $a_{211}$) from 75 to 99.9% by weight of a $C_2-C_{10}$-alkyl acrylate,
  - $a_{212}$) from 0.1 to 5% by weight of a polyfunctional monomer having two or more olefinic, nonconjugated double bonds, and
  - $a_{213}$) from 0 to 24.9% by weight of further copolymerizable monomers, and
- $a_{22}$) from 10 to 50% by weight of a graft of a$_{221}$) from 50 to 90% by weight of styrene or substituted styrenes of the general formula I or a mixture thereof, and a$_{222}$) from 10 to 50% by weight of acrylonitrile or methacrylonitrile or a mixture thereof.

Component a$_{21}$) is an elastomer which has a glass transition temperature of less than $-20°$ C., in particular less than $-30°$ C.

For the preparation of the elastomer, esters of acrylic acid having 2 to 10, in particular 4 to 8, carbon atoms are used as main monomers a$_{211}$). Examples of particularly preferred monomers are iso- and n-butyl acrylate and 2-ethylhexyl acrylate, of which the two last-mentioned are particularly preferred.

In addition to these esters of acrylic acid, from 0.1 to 5, in particular from 1 to 4, % by weight, based on the total weight of a$_{211}$+a$_{212}$, of a polyfunctional monomer having two or more olefinic double bonds are used. Of these, difunctional compounds, i.e. compounds having two nonconjugated double bonds, are preferably used. Examples of these are divinylbenzene, diallyl fumarate, diallyl phthalate, triallyl cyanurate, triallyl isocyanurate, tricyclodecenyl acrylate and dihydrodicyclopentadienyl acrylate, of which the two last-mentioned are particularly preferred.

In addition to the monomers a$_{211}$) and a$_{212}$), up to 24.9, preferably up to 20% by weight of further copolymerizable monomers, preferably buta-1,3-diene, styrene, α-methylstyrene, acrylonitrile, methacrylonitrile and C$_1$-C$_8$-alkyl esters of methacrylic acid or mixtures of these monomers, may also be used in the synthesis of the grafting base.

Processes for the preparation of the grafting base a$_{21}$) are known per se and are described in, for example, DE-B 1 260 135. Corresponding products are also commercially available.

Preparation by emulsion polymerization has proven particularly advantageous in some cases.

The amount of the grafting base a$_{21}$) in the graft polymer a$_2$) is from 50 to 90, preferably from 55 to 85, in particular from 60 to 80, % by weight, based on the total weight of a$_2$).

A graft shell a$_{22}$), which is obtainable by co-polymerization of a$_{221}$) from 50 to 90, preferably from 60 to 90, in particular from 65 to 80, % by weight of styrene or substituted styrenes of the general formula I

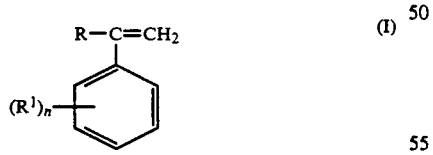

$$R-C=CH_2 \quad (I)$$
$$(R^1)_n$$

where R is alkyl of 1 to 8 carbon atoms, hydrogen or halogen and R$^1$ is alkyl of 1 to 8 carbon atoms or halogen, n is 0, 1, 2 or 3, and a$_{222}$) from 10 to 50, preferably from 10 to 40, in particular from 20 to 35, % by weight of acrylonitrile or methacrylonitrile or a mixture thereof, is grafted onto the grafting base a$_{21}$).

Examples of substituted styrenes are α-methylstyrene, p-methylstyrene, p-chlorostyrene and p-chloro-α-methylstyrene; styrene and °-methylstyrene are particularly preferred as monomers a$_{221}$.

The graft shell a$_{22}$) can be prepared in one process step or in a plurality of, for example two or three, process steps, the overall composition remaining unaffected by this.

The graft shell is preferably prepared in emulsion, as described in, for example, German Patent 1,260,135 and German Laid-Open Applications DOS 3,227,555, DOS 3,149,357 and DOS 3,414,118.

Depending on the conditions chosen, a certain amount of free copolymers of the monomers a$_{221}$) and a$_{222}$) is formed during the graft copolymerization.

The graft copolymer (a$_{21}$+a$_{22}$) generally has a median particle size of from 50 to 1,000 nm, in particular from 80 to 700 nm (d$_{50}$ value based on weight). The conditions during the preparation of the elastomer a$_{21}$) and during grafting are therefore preferably chosen so that particle sizes in this range result. Measures for this purpose are known and are described in, for example, German Patent 1,260,135, German Laid-Open Application DOS 2,826,925 and J. Appl. Polym. Sci. (1965), 2929-2938. The particle sizes of the latex of the elastomer can be increased, for example, by agglomeration.

For the purposes of the present invention, the graft polymers a$_2$ include the free, ungrafted homo- and copolymers formed in the graft copolymerization for the preparation of component a$_{22}$). A few preferred graft polymers are listed below:

a$_2$/1: 60% by weight of grafting base a$_{21}$) of
    a$_{211}$) 98% by weight of n-butyl acrylate and
    a$_{212}$) 2% by weight of dihydrodicyclopentadienyl acrylate and 40% by weight of graft shell a$_{22}$) of
    a$_{221}$) 75% by weight of styrene and
    a$_{222}$) 25% by weight of acrylonitrile a$_2$/2: Grafting base as for a$_2$/1, with 5% by weight of a first graft shell of styrene and 35% by weight of a second graft shell of
    a$_{221}$) 75% by weight of styrene and
    a$_{222}$) 25% by weight of acrylonitrile a$_2$/3: Grafting base as for a$_2$/1, with 13% by weight of a first graft shell of styrene and 27% by weight of a second graft shell of styrene and acrylonitrile in a weight ratio of 75:25.

The novel molding materials contain, as component a$_3$), from 10 to 25, preferably from 12 to 20, % by weight of a copolymer of a$_{31}$) from 50 to 90, preferably from 55 to 90, in particular from 65 to 80, % by weight of styrene and/or substituted styrenes of the general formula I and a$_{32}$) from 10 to 50, preferably from 10 to 45, in particular from 20 to 35, % by weight of acrylonitrile and/or methacrylonitrile.

The novel molding materials are distinguished by good strength, high impact strength and a particularly good surface structure of the moldings produced therefrom. Furthermore, the deformation properties and the heat distortion resistance are particularly advantageous.

EXAMPLES

The following components were used:
a$_{11}$) polybutylene terephthalate having a viscosity number of 108 cm$^3$/g, determined according to DIN 53,728,
Part 2 (Ultradur ® B2550 from BASF AG)
a$_{12}$) polyethylene terephthalate having a viscosity number of 75 cm$^3$/g (0.5% strength in 60:40 phenol/o-dichlorobenzene at 25° C.)

a2) Graft polymer of

| | |
|---|---|
| 58.8% by weight of n-butyl acrylate<br>1.2% by weight of dihydrodicyclopentadienyl acrylate | Grafting base |
| 30% by weight of styrene<br>10% by weight of acrylonitrile | Graft shell |

Graft shell prepared by the process described in DE-A 24 44 584.

a3) Styrene/acrylonitrile copolymer (weight ratio 65:35) having a viscosity number of 80, measured in 0.5% strength solution in dimethylformamide (DMF) at 25° C.

B) Glass fibers

The compositions of both Examples also contained the following additives (in each case in % by weight, based on the total weight of A)+B)):
1.5% by weight of carbon black
0.1% by weight of talc
0.8% by weight of pentaerythritol stearate The compositions described in the Table were melted and the melts were extruded. After extrusion, the test specimens required for the determinations of the properties were produced by injection molding.

The results of the measurements are shown in the Table.

| Component | Example 1 | Example 2 Comparison |
|---|---|---|
| $a_{11}$ (% by weight) | 48 | 56 |
| $a_{12}$ (% by weight) | 8 | — |
| $a_2$ (% by weight) | 12 | 12 |
| $a_3$ (% by weight) | 12 | 12 |
| B (% by weight) | 20 | 20 |
| Total energy $W_{50}$ [Nm][1] | 4.5 | 2.5 |
| Surface gloss (DIN 67,530) | 88 | 70 |
| Surface quality | Good<br>Glass fibers not visible | Less good<br>Glass fibers visible |
| Minimum charging pressure for injection molding a test box [bar] | 380 | 400 |
| Deformation of test box, measured along the longitudinal side [mm] | 0.48 | 0.60 |
| Heat distortion resistance (°C.) | 186 | 170 |
| Colorability | Good | Less good |

[1]Penetration test according to DIN 53,443 on 2 mm circular disks

The results in the Table show clearly that the novel materials are superior in their property spectrum to the materials disclosed in DE-B 2 758 497.

We claim:

1. A thermoplastic molding material consistently essentially of,
A) from 45 to 90% by weight of a mixture of
  a1) from 50 to 80% by weight of a mixture of
    a11) from 60 to 99% by weight, based on $a_{11}+a_{12}$), of polybutylene terephthalate and
    a12) from 1 to 90% by weight, based on $a_{11}+a_{12}$), of polyethylene terephthalate,
  a2) from 10 to 25% by weight of a graft polymer composed of
    a21) from 50 to 90% by weight of a grafting base of an elastomeric polymer based on
      a211) from 75 to 99.9% by weight of a $C_2$-$C_{10}$-alkyl acrylate and
      a212) from 0.1 to 5% by weight of a polyfunctional monomer having two or more olefinic, nonconjugated double bonds and
      a213) from 0 to 24.9% by weight of further copolymerizable monomers, and
    a22) from 10 to 50% by weight of a graft of
      a221) from 50 to 90% by weight of styrene or substituted styrenes of the formula I

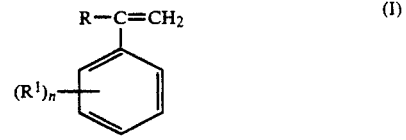

where R is alkyl of 1 to 8 carbon atoms, hydrogen or halogen, $R^1$ is alkyl of 1 to 8 carbon atoms or halogen and n is 0, 1, 2 or 3, or a mixture thereof, and
      a222) from 10 to 49% by weight of acrylonitrile or methacrylonitrile or a mixture thereof,
  a3) from 10 to 25% by weight of a copolymer of
    a31) from 50 to 90% by weight of styrene or substituted styrenes of the formula I or a mixture thereof and
    a32) from 10 to 49% by weight of acrylonitrile or methacrylonitrile or a mixture thereof, and
B) from 5 to 50% by weight of glass fibers.

2. A thermoplastic molding material as claimed in claim 1, consisting essentially of,
A) from 55 to 90% by weight of a mixture of
  a1) from 50 to 80% by weight of a mixture of
    a11) from 60 to 99% by weight, based on $a_{11}+a_{12}$), of polybutylene terephthalate and
    a12) from 1 to 40% by weight, based on $a_{11}+a_{12}$), of polyethylene terephthalate,
  a2) from 10 to 25% by weight of a graft polymer of
    a21) from 50 to 90% by weight of a grafting base consisting of
      a211) from 75 to 99.9% by weight of n-butyl acrylate and/or 2-ethylhexyl acrylate and
      a212) from 0.1 to 5% by weight of a bifunctional monomer and
      a213) from 0 to 24.9% by weight of buta-1,3-diene, styrene, acrylonitrile, methacrylonitrile and/or $C_1$-$C_8$-methacrylates, and
    a22) from 10 to 50% by weight of a graft of
      a211) from 50 to 90% by weight of styrene or α-methylstryene or a mixture thereof and
      a222) from 10 to 49% by weight of acrylonitrile or methacrylonitrile or a mixture thereof,
  a3) from 10 to 25% by weight of a copolymer of
    a31) from 50 to 90% by weight of styrene or α-methylstyrene or a mixture thereof and
    a32) from 10 to 49% by weight of acrylonitrile or methacrylonitrile or a mixture thereof, and
B) from 10 to 40% by weight of glass fibers.

3. A molding produced from a thermoplastic molding material as claimed in claim 1.

4. A thermoplastic molding material as claimed in claim 1, wherein $a_{11}$ is from 75 to 97% by weight, based on $a_{11}+a_{12}$, and wherein $a_{12}$ is from 3 to 25% by weight, based on $a_{11}+a_{12}$.

5. A thermoplastic molding material as claimed in claim 2, wherein $a_{11}$ is from 75 to 97% by weight, based on $a_{11}+a_{12}$, and wherein $a_{12}$ is from 3 to 25% by weight, based on $a_{11}+a_{12}$.

* * * * *